(12) United States Patent
Hiipakka et al.

(10) Patent No.: US 8,595,624 B2
(45) Date of Patent: Nov. 26, 2013

(54) SOFTWARE APPLICATION OUTPUT VOLUME CONTROL

(75) Inventors: Jarmo Antero Hiipakka, Espoo (FI); Marko Jaakko Hietala, Helsinki (FI)

(73) Assignee: Nokia Corporation, Espoo (FI)

( * ) Notice: Subject to any disclaimer, the term of this patent is extended or adjusted under 35 U.S.C. 154(b) by 476 days.

(21) Appl. No.: 12/915,980

(22) Filed: Oct. 29, 2010

(65) Prior Publication Data
US 2012/0110452 A1 May 3, 2012

(51) Int. Cl.
*G06F 3/00* (2006.01)
*G06F 3/16* (2006.01)

(52) U.S. Cl.
USPC .......................................... 715/716; 715/727

(58) Field of Classification Search
USPC .............................. 715/716, 727; 381/108, 84
See application file for complete search history.

(56) References Cited

U.S. PATENT DOCUMENTS

| | | | |
|---|---|---|---|
| 6,111,961 A | 8/2000 | Hedrick et al. | |
| 7,502,480 B2 | 3/2009 | Baudisch et al. | |
| 2002/0108484 A1* | 8/2002 | Arnold et al. | 84/615 |
| 2002/0133513 A1* | 9/2002 | Townsend et al. | 707/500.1 |
| 2005/0159189 A1* | 7/2005 | Iyer | 455/566 |
| 2006/0272483 A1* | 12/2006 | Honeywell | 84/609 |
| 2006/0291666 A1 | 12/2006 | Ball et al. | |
| 2007/0083825 A1* | 4/2007 | Chaudhri et al. | 715/788 |
| 2009/0106657 A1* | 4/2009 | Chaudhri | 715/716 |
| 2010/0066677 A1* | 3/2010 | Garrett et al. | 345/163 |
| 2010/0267376 A1* | 10/2010 | Saari et al. | 455/418 |

FOREIGN PATENT DOCUMENTS

JP 10-149274 A 6/1998
KR 10-0630206 B1 9/2006

OTHER PUBLICATIONS

Flat Volume Control Homepage [online] [retrieved Dec. 22, 2010]. Retrieved from the internet: <URL: http://www.patrickbaudisch.com/projects/flatvolumecontrol/index.html>. 1 page.
Master Volume Control—Android App on AppBrain [online] [retrieved Aug. 17, 2010]. Retrieved from the internet: <URL: http://www.appbrain.com/app/com.sanels.mastervolume>. 2 pages.
Can the "Master" Volume Control the "Headphone" Jack???—FedoraForum.org [online] [retrieved Aug. 17, 2010]. Retrieved from the internet: <URL: http://forums.fedoraforum.org/showthread.php?t=197641>. 3 pages.

* cited by examiner

*Primary Examiner* — Rashawn Tillery
(74) *Attorney, Agent, or Firm* — Alston & Bird LLP

(57) ABSTRACT

Apparatus comprises means for independently controlling the output volume levels of a plurality of software applications associated with the apparatus; means responsive to a user command to change a master volume level for changing the volume levels of each of the software applications in the same sense; and when one of the plurality of software applications is at a maximum volume level, means responsive to a user command to increase the master volume level for increasing the volume levels of each of the other software applications which are not at the maximum level.

17 Claims, 8 Drawing Sheets

SOFTWARE APPLICATION OUTPUT VOLUME CONTROL

FIELD OF THE INVENTION

This invention relates generally to software application output volume control.

BACKGROUND TO THE INVENTION

It is now common for mobile devices to store and run multiple software applications. Many of these applications produce sounds, such as notifications and music. In conventional computing devices such as PCs and laptops it is common to have a control panel or mixer for controlling the respective volume levels of different devices and software applications.

SUMMARY OF THE INVENTION

A first aspect of the invention provides apparatus comprising:
  means for independently controlling the output volume levels of a plurality of software applications associated with the apparatus;
  means responsive to a user command to change a master volume level for changing the volume levels of each of the software applications in the same sense; and
  when one of the plurality of software applications is at a maximum volume level, means responsive to a user command to increase the master volume level for increasing the volume levels of each of the other software applications which are not at the maximum level.

The apparatus may further comprise means for causing an indication of the master volume level to be displayed. The master volume level indicator may be a slider with a slider marker. The master volume indicator may have an additional region beyond a maximum volume position and wherein increasing the master volume level when one of the plurality of software applications is at a maximum volume level comprises causing the master volume slider marker to be moved into the additional region. The master volume slider marker may automatically returns to the maximum volume position when the user command to increase the master volume level ceases.

The apparatus may further comprising means for causing indications of the output volume levels of the plurality of software applications to be displayed. The software application volume level indicators may be sliders with slider markers.

The user commands to change or increase the master volume level may be received via a touch sensitive display of the apparatus. Alternatively, the user command to change or increase the master volume level may be received at a hardware key of the apparatus or the user command to change or increase the master volume level is received at a hardware key of an external device.

The software applications may be installed on the apparatus.

A second aspect of the invention comprises means for causing an indication of the master volume level to be displayed that is configured to cause indications of the output volume levels of one or more sounds to be displayed, wherein the one or more sounds are only responsive to the means responsive to a user command to increase the master volume level for increasing the volume levels of each of the other software applications which are not at the maximum level when actively in use.

A third aspect of the invention comprises means for causing an indication of the master volume level to be displayed is further configured to cause indications of the output volume levels of one or more sounds to be displayed, wherein the one or more sounds are not responsive to the means responsive to a user command to increase the master volume level for increasing the volume levels of each of the other software applications which are not at the maximum level.

In either of the second and third aspects, the one or more sounds are one or more profile dependent sounds.

A fourth aspect of the invention comprises means for causing an indication of the master volume level to be displayed configured to cause indications of the output volume levels of external devices in communication with the apparatus to be displayed, wherein the external devices are not responsive to the means responsive to a user command to increase the master volume level for increasing the volume levels of each of the other software applications which are not at the maximum level.

A fifth aspect of the invention comprises a subclass of a plurality of software applications, and means configured to refrain from causing individual indications of the output volume levels for the software applications comprising the subclass to be displayed, and further configured to cause an indication relating to the output volume level of this subclass of software applications to be displayed.

A sixth aspect of the invention comprises a method comprising:
  independently controlling the output volume levels of a plurality of software applications associated with an apparatus;
  responding to a user command to change a master volume level by changing the volume levels of each of the software applications in the same sense; and
  when one of the plurality of software applications is at a maximum volume level, responding to a user command to increase the master volume level by increasing the volume levels of each of the other software applications which are not at the maximum level.

A seventh aspect of the invention comprises a computer program comprising instructions that when executed by computer apparatus control it to perform this method.

An eighth aspect of the invention comprises a non-transitory computer-readable storage medium having stored thereon computer-readable code, which, when executed by computing apparatus, causes the computing apparatus to perform a method comprising:
  independently controlling the output volume levels of a plurality of software applications associated with an apparatus;
  responding to a user command to change a master volume level by changing the volume levels of each of the software applications in the same sense; and
  when one of the plurality of software applications is at a maximum volume level, responding to a user command to increase the master volume level by increasing the volume levels of each of the other software applications which are not at the maximum level.

A ninth aspect of the invention comprises apparatus, the apparatus having at least one processor and at least one memory having computer-readable code stored thereon which when executed controls the at least one processor:

independently to control the output volume levels of a plurality of software applications associated with an apparatus;

to respond to a user command to change a master volume level by changing the volume levels of each of the software applications in the same sense; and when one of the plurality of software applications is at a maximum volume level, to respond to a user command to increase the master volume level by increasing the volume levels of each of the other software applications which are not at the maximum level.

BRIEF DESCRIPTION OF THE DRAWINGS

Embodiments of the present invention will now be described, by way of example only, with reference to the accompanying drawings, in which.

DETAILED DESCRIPTION OF PREFERRED EMBODIMENTS

Figure 1:
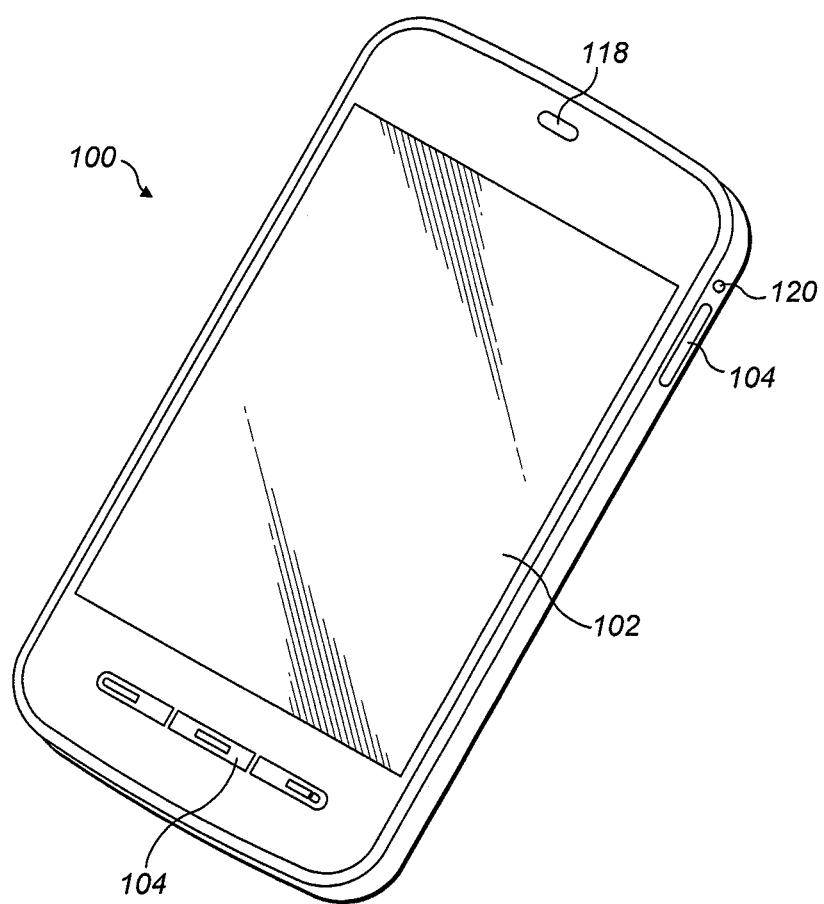
FIG. 1 is a perspective view of a mobile terminal embodying aspects of the invention.

Referring firstly to FIG. 1, a terminal 100 is shown. The exterior of the terminal 100 has a touch sensitive display 102, hardware keys 104, a speaker 118 and a headphone port 120.

Figure 2:
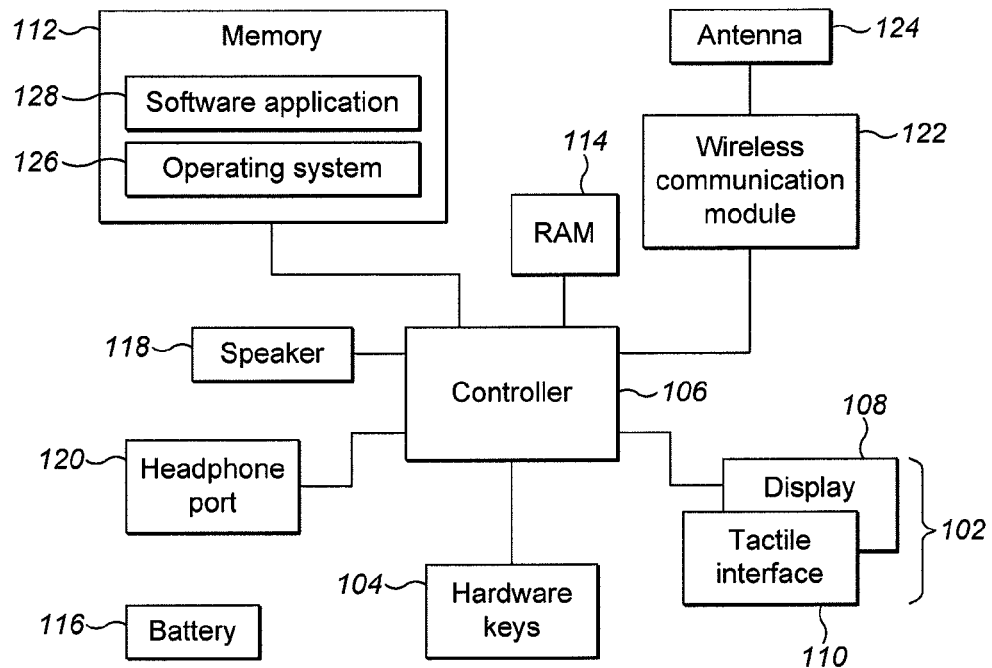
FIG. 2 is a schematic diagram illustrating components of the FIG. 1 mobile terminal and their interconnection.

FIG. 2 shows a schematic diagram of the components of terminal 100. The terminal 100 has a controller 106, a touch sensitive display 102 comprised of a display part 108 and a tactile interface part 110, the hardware keys 104, a memory 112, RAM 114, a speaker 118, the headphone port 120, a wireless communication module 122, an antenna 124 and a battery 116. The controller 106 is connected to each of the other components (except the battery 116) in order to control operation thereof.

The memory 112 may be a non-volatile memory such as read only memory (ROM) a hard disk drive (HDD) or a solid state drive (SSD). The memory 112 stores, amongst other things, an operating system 126 and may store software applications 128. The RAM 114 is used by the controller 106 for the temporary storage of data. The operating system 126 may contain code which, when executed by the controller 106 in conjunction with RAM 114, controls operation of each of the hardware components of the terminal.

The controller 106 may take any suitable form. For instance, it may be a microcontroller, plural microcontrollers, a processor, or plural processors.

The terminal 100 may be a mobile telephone or smartphone, a personal digital assistant (PDA), a portable media player (PMP), a portable computer or any other device capable of running software applications and providing audio outputs. In some embodiments, the terminal 100 may engage in cellular communications using the wireless communications module 122 and the antenna 124. The wireless communications module 122 may be configured to communicate via several protocols such as GSM, CDMA, UMTS, Bluetooth and IEEE 802.11 (Wi-Fi).

The display part 108 of the touch sensitive display 102 is for displaying images and text to users of the terminal and the tactile interface part 110 is for receiving touch inputs from users.

As well as storing the operating system 126 and software applications 128, the memory 112 may also store multimedia files such as music and video files. A wide variety of software applications 128 may be installed on the terminal including web browsers, radio and music players, games and utility applications. Some or all of the software applications stored on the terminal may provide audio outputs. The audio provided by the applications may be converted into sound by the speaker(s) 118 of the terminal or, if headphones or speakers have been connected to the headphone port 120, by the headphones or speakers connected to the headphone port 120.

In some embodiments the terminal 100 may also be associated with external software application not stored on the terminal. These may be applications stored on a remote server device and may run partly or exclusively on the remote server device. These applications can be termed cloud-hosted applications. The terminal 100 may be in communication with the remote server device in order to utilise the software application stored there. This may include receiving audio outputs provided by the external software application.

In some embodiments, the hardware keys 104 are dedicated volume control keys or switches. The hardware keys may for example comprise two adjacent keys, a single rocker switch or a rotary dial. In some embodiments, the hardware keys 104 are located on the side of the terminal 100.

FIGS. 3 to 6 illustrate a software application volume control panel 200. The software application volume control panel 200 has a number of volume indicators in the form of sliders. For example, the volume indicators may comprise a horizontal bar or line and a slidable marker which indicates the current volume level and which moves horizontally along the bar.

Shown in FIGS. 3 to 6 are a master volume level indicator 202 having a master volume level slider marker 203, a music application volume level indicator 204 having a music application volume level slider marker 205, a browser application volume level indicator 206 having a browser application volume level slider marker 207 and a map application volume level indicator 208 having a map application volume level slider marker 209. Also shown in FIGS. 3 to 6 is an extra area 210 located at the right end of the master volume level indicator 202. The extra area 210 is located beyond a nominal maximum volume level position of the master volume level indicator 202. The dashed vertical line is an optional feature and is present to help make clear the relative positions of the sliders. Each indicator 202, 204, 206, 208 has a label at the right hand side of the volume control panel 200.

These labels are shown as words, but may be symbols or animations. The labels may alternatively be located at the left hand side each volume level indicator 202, 204, 206, 208 or above or below each volume level indicator.

The software which generates the volume control panel 200 may be part of the operating system 126 or may be one of the separate software applications 128 installed on the terminal 100. In order to access the volume control panel 200 a user may navigate to a settings menu from which the volume control panel 200 software can be executed. Each of the music application, browser application and map application volume levels represents the output volume level of the respective application. In practice this may correspond to a gain which is applied to the digital or analogue representation of audio signals created by each of the software applications.

Each software application 128 associated with the terminal 100 and which produces audio has its own internal volume control and is configured to link its internal volume control with the volume level indicator 202, 204, 206, 208 which represents it in the volume control panel 200. For example, when a software application is started, it may send a request to install a volume indicator 202, 204, 206, 208 in the volume control panel 200 which is linked to its internal volume control. This request is received by the operating system 126 or software application 128 running the volume control panel. Alternatively, the operating system 126 can send a message to the software application 128 upon start up to achieve the same objective. In this manner, a change to the volume level indicator 202, 204, 206, 208 in the volume control panel 200 is interpreted by the related software application 128 as a command to change its internal volume level correspondingly. Some applications may have more than one volume level. For example, a game may have a sound effects volume level and a background music volume level. In these cases the application may request that multiple volume level indicators are installed in the volume control panel, one for each independently controllable audio output.

External software applications associated with the terminal 100 may also produce audio signals and may also be configured to link their internal volume controls with volume level indicators in the volume control panel 200 in the same way as described above in relation to the software applications 128 stored on the terminal 100. No external software application volume level indicators are shown in the Figures.

In some embodiments, when a software application is no longer actively running, its volume level indicator is removed from the volume control panel 200. In some other embodiments the operating system 126 is configured to retain in the volume control panel 200 the volume level indicators of applications which are no longer running. The volume level indicators of applications which are no longer running may remain in the volume control panel 200 for a predetermined length of time, or the one or two most recently used applications may be retained. A user of the terminal 100 may control the volume levels of each software application 128 individually or may change the master volume level to affect all of the software application volume levels simultaneously. A user may control the volume levels by selecting and dragging their associated slider markers 203, 205, 207, 209. This may be accomplished with the tactile interface 110 of the touch sensitive display 102 or via another form of user input such as a trackpad, keypad, specifically assigned hardware key 104, voice command or movement of the terminal. In some embodiments, control of the volume levels may be accomplished via the hardware keys of an external device connected to or in communication with the terminal 100. The external device may be a remote control device, speakers or headset that may be connected to the terminal 100 wirelessly, for example using Bluetooth. In some embodiments the terminal 100 may be responsive both to user inputs at hardware keys of external devices as well as hardware keys 104 on the terminal 100. Therefore within this specification, future occurrences of "hardware keys 104" are intended to refer additionally or alternatively to hardware keys of an external device.

When the master volume level, as represented by the master volume slider marker 203, is changed, the volume levels of the software applications 128, as represented by the slider markers 205, 207, 209, maintain their positions relative to one another, but are all changed in the same sense as the master volume level, i.e. up or down.

The master volume level is a general volume level which does not relate to any specific device, component or software application but which affects all other volume levels. In some embodiments, the master volume level slider marker 203 is set equal to the highest software application volume level slider marker 205, 207, 209. For example, in FIG. 3 the map application volume level, as represented by the slider marker 209, is the highest of the three levels shown. The master volume level slider marker 203 is aligned vertically with the map application volume level slider 209. A dashed line connecting the two sliders may be provided to make this clear to a user. In these embodiments, if the map application volume level slider marker 209 is moved rightwards, causing the map application volume level to be increased, the master volume level slider marker 203 also moves rightwards, remaining aligned with the map application volume level slider marker 209. The markers 205, 207 for the other software applications remain at the same positions, and the volume levels for those applications remains unchanged. Therefore in these embodiments, the master volume level corresponds to the loudest of the currently active software applications. Conversely, if the map application volume level slider marker 209 is moved leftwards, causing the map application volume level to be decreased, the master volume level slider marker 203 also moves leftwards, remaining aligned with the map application volume level slider 209 until such time as the map application volume level is no longer the highest volume level. For example, if the map application volume level is decreased below that of the music application volume level, then the master volume level slider 203 becomes aligned with the music application volume level slider 205.

If a user of the terminal 100 moves the master volume level slider marker 203 rightwards, the master volume level increases. The master volume level may also be increased by a user input at hardware keys 104, which causes the master volume level slider marker 203 to move rightwards. Since the master volume level relates generally to all software applications, the volume levels of all of the software applications 128 which the master volume affects are also increased. Conversely if the master volume level is decreased, the volume levels of all of the software applications 128 which the master volume affects are also decreased. During increase or decrease, all of the software application volume level slider markers 205, 207, 209 maintain their positions relative to each other.

The volume control panel 200 is represented in FIGS. 3 to 6 as a window containing a series of horizontal indicators. However, the indicators may alternatively be arranged vertically or in some other configuration. Furthermore, the indicators need not take the form of slider markers 203, 205, 207, 209 as shown in FIGS. 3 to 6 but may take any suitable form. The extra area 210 may be coloured and/or shaped in order to draw attention to or symbolise its function. For example, the extra area 210 may be red and of greater height than the bar of the master volume level indicator 202.

Figure 3:
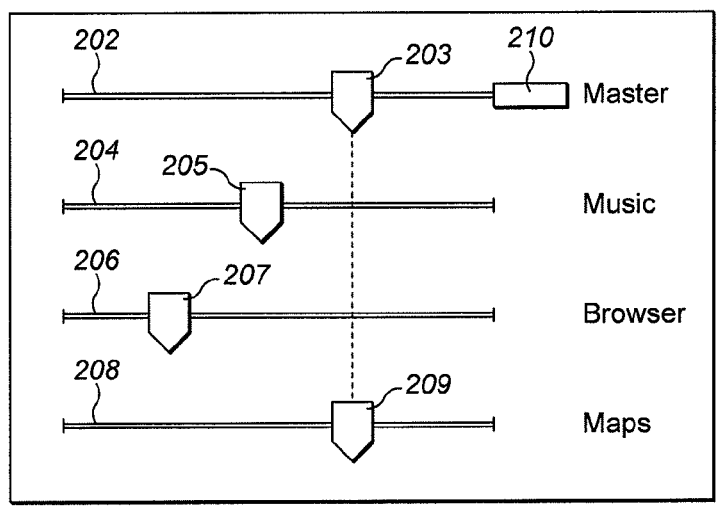
FIGS. 3, 4, 5 and 6 are screenshots from the mobile terminal of FIGS. 1 and 2 showing a volume control panel according to a first embodiment.

Referring to FIG. 3, an initial state is shown in which the three software application volume level indicators 202, 204, 206 each indicate a different volume level. The map application volume level is the highest of the three and the master volume level slider marker 203 is aligned with the map application volume level slider marker 209.

Figure 4:
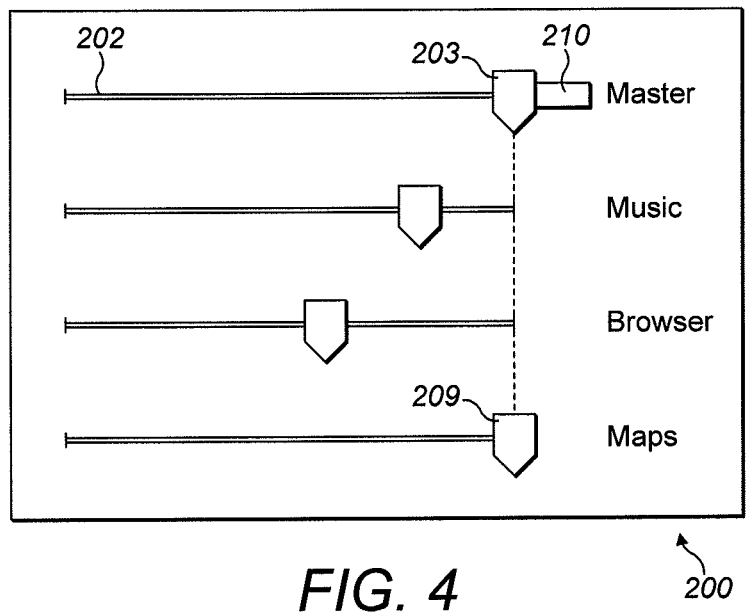

FIG. 4 shows a screenshot of the volume control panel 200 after a user of the terminal has caused the master volume level to be increased to a maximum level. This may be achieved as described above, for example by using the tactile interface 110 of the touch sensitive display 102 to select and drag the master volume slider marker 203. The map application volume level, as represented by the slider marker 209, has therefore also been increased to a maximum level. The volume levels of the music application and browser application have been increased by the same amount such that the relative positions of the software application sliders are maintained.

Figure 5:
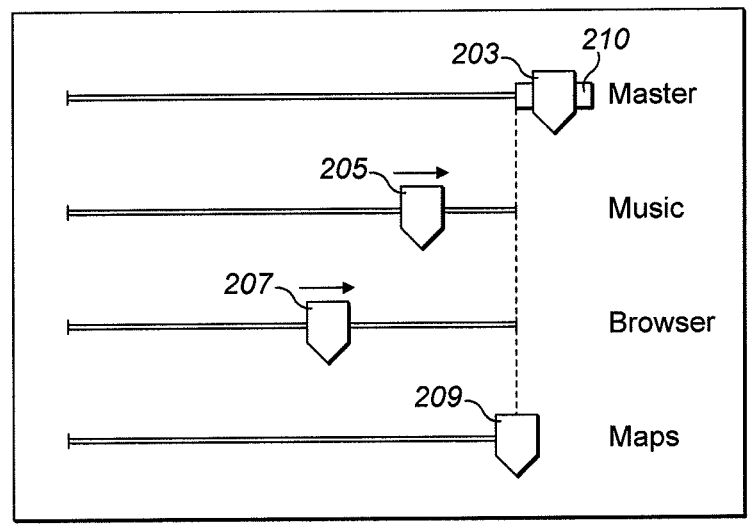

FIG. 5 shows a screenshot of the volume control panel 200 in which a user of the terminal 100 has caused the master volume slider marker 203 to be moved into the extra area 210 located beyond a maximum volume level position of the master volume level indicator 202. Retaining the master volume level slider marker 203 in the extra area may require a continuous input from a user. For example the user must maintain contact with the tactile interface 110 after dragging the master slider marker 203 or they must continuously depress a hardware key 104. Since the map application volume level is already at maximum, it cannot increase further.

Therefore the map application volume level slider marker 209 does not move and remains at the maximum level. However, while the master volume level slider marker 203 is retained in the extra area 210, all of the software application volume levels which are not at maximum are increased. Arrows above the music and browser application volume level slider markers 205, 207 indicate that these slider markers are moving rightwards. This feature allows a user simultaneously to increase all of the software application volume levels which are not at the maximum level, rather than having to increase each volume level individually. The extra area 210, located beyond the maximum volume level point provides an intuitive control feature which can be relatively easy for users of all abilities to understand.

The rate at which the slider markers 205, 207 move may be dependent on the distance by which the master volume level slider marker 203 is moved beyond the maximum volume position and into the extra area. If the master volume level slider marker 203 is moved a small distance beyond the maximum volume position, the slider markers 205, 207 move relatively slowly. If the master volume level slider marker 203 is moved a larger distance beyond the maximum volume position, the slider markers 205, 207 move relatively rapidly. In other embodiments the rate at which the slider markers 205, 207 move is constant. The slider markers 205, 207 may move in small increments or may move continuously. This allows a user to cause a slow increase in order accurately to control by how much the software application volume levels are increased or to rapidly increase all of the software application volume levels to maximum.

Figure 6:
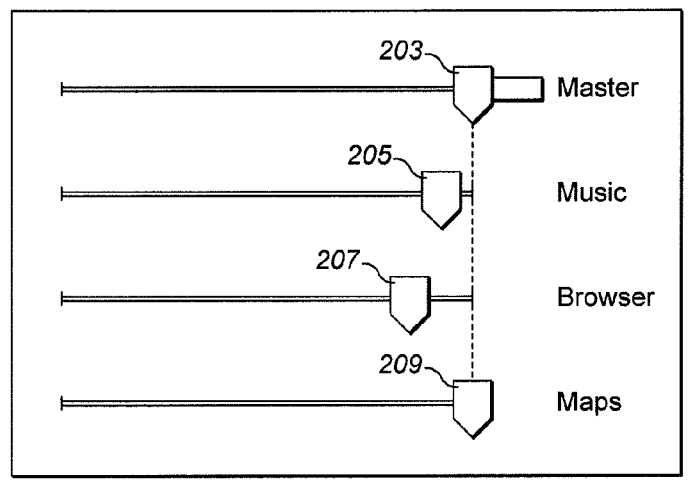

FIG. 6 shows a screenshot of the volume control panel 200 in which the master volume level slider marker 203 is no longer being retained in the extra area 210. When a user of the terminal 100 ceases to cause the master volume level slider marker 203 to be retained in the extra area, the master slider marker 203 automatically returns to the maximum volume level position. When this occurs, the software application volume levels which are not at maximum stop increasing. This automatic movement makes it clear to a user whether or not the master volume level slider marker 203 is being retained in the extra area 210. As can be seen in FIG. 6, the music and browser application volume levels, as represented by the slider markers 205, 207, have been increased when compared with their positions in FIG. 4, while the master volume level and the map application volume level, represented by the slider markers 203 and 209 respectively, remain at the maximum.

Figure 7:
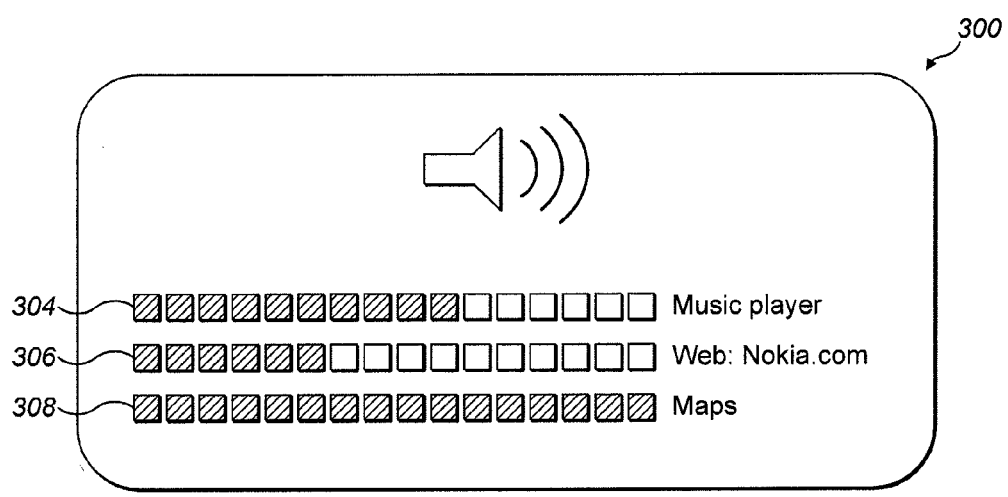
FIGS. 7 and 8 are overlays, displayed on the mobile terminal of FIGS. 1 and 2, showing software application volume levels according to a second embodiment.

In other embodiments of the invention, the software application volume levels can be displayed to a user of the terminal 100 without accessing the volume control panel 200. FIG. 7 shows an example of an overlay 300 containing information about the volume levels of the music, browser and map applications 128. The overlay 300 has a music application volume level indicator 304, a browser application volume level indicator 306 and a map application volume level indicator 308. These application volume levels are shown by way of example only. The overlay 300 may contain other application volume levels and may also show a master volume level indicator (not shown in the figure).

Each indicator 304, 306, 308 has the form of a row of elements of equal size and shape where each of a group of the elements at one end of the indicator has a different physical appearance to other ones of the elements, the junction between the elements of different appearances indicating the volume level. The indicators 304, 306, 308 may instead take some other form.

Each indicator 304, 306, 308 has a label next to it identifying the application to which the indicator relates. These labels are show in FIG. 7 as words but may be symbols, pictures or animations. The labels may be located to the right, left, above, below or within the indicators.

The overlay 300 is displayed in response to a user command to change the master volume level; prior to the user command the overlay 300 is not displayed. As shown in FIG. 7, the overlay 300 may not display the master volume level itself. In some embodiments, a user of the terminal presses a dedicated hardware key 104 for increasing or decreasing the volume. In response an overlay 300 is displayed on display 102 on top of the currently displayed content. In some embodiments the overlay 300 is transparent or translucent. In some embodiments the overlay 300 is displayed for a short period of time before disappearing.

FIG. 7 shows an overlay in which the volume settings are the same as those shown in FIG. 3; the map application volume level is at a maximum while the music and browser application volume levels are set at lower levels. A master volume level is not shown in the particular embodiment of FIG. 7. When a user of the terminal inputs a command to increase the master volume, the volume levels of the music application and browser application are increased while the map application volume level remains at maximum. The overlay 300 is displayed so that the user can see that the input command has had an effect on the volume levels. This functionality allows a user to increase all of the software application volume levels which are not at a maximum with a single, one touch, input. The user is provided with an immediate feedback of their action, irrespective of what else they may be using the terminal for at the time.

The overlay 300 is designed to be a condensed display giving the user detailed information about the volume levels of currently active applications in a compact window. In some embodiments, the overlay 300 is not an active object, meaning that a user cannot select any object within or other interact with the overlay while it is being displayed. The overlay may be displayed automatically when a volume control hardware key 104 is pressed but it is not then active via the touch sensitive display 102 of the terminal 100. As mentioned previously, the overlay 300 may be transparent and may appear for only a short time. The user may therefore continue to view and interact with objects behind the overlay while the overlay is being displayed. These features aid in causing the overlay to be relatively unobtrusive to a user of the terminal.

Figure 8:
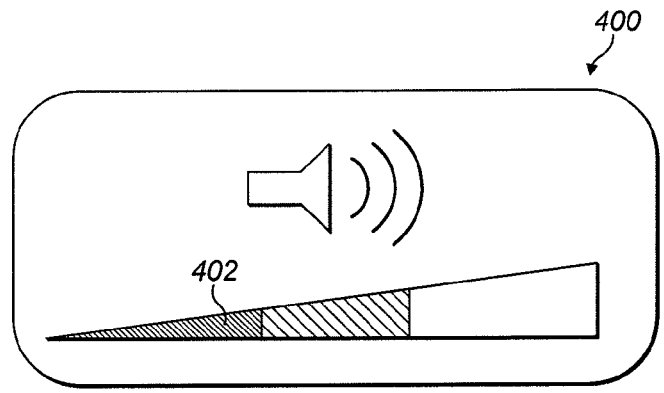

FIG. 8 shows an example of an overlay 400 which is further condensed. In this embodiment a single composite volume level indicator 402 is displayed on the overlay. The composite indicator may be a wedge shape with the thick end of the wedge representing higher volume levels. The composite volume level indicator 402 may have colour coded segments to represent each active application. The boundary of each segment may move further to the right as the volume is increased. In some embodiments the composite volume level indicator 402 may have labels within or above each segment to indicate to which application the segment corresponds. In other respects, the overlay 400 is similar to that of FIG. 7 and may be an inactive object which is transparent and displayed for a predetermined period of time.

Figure 9:
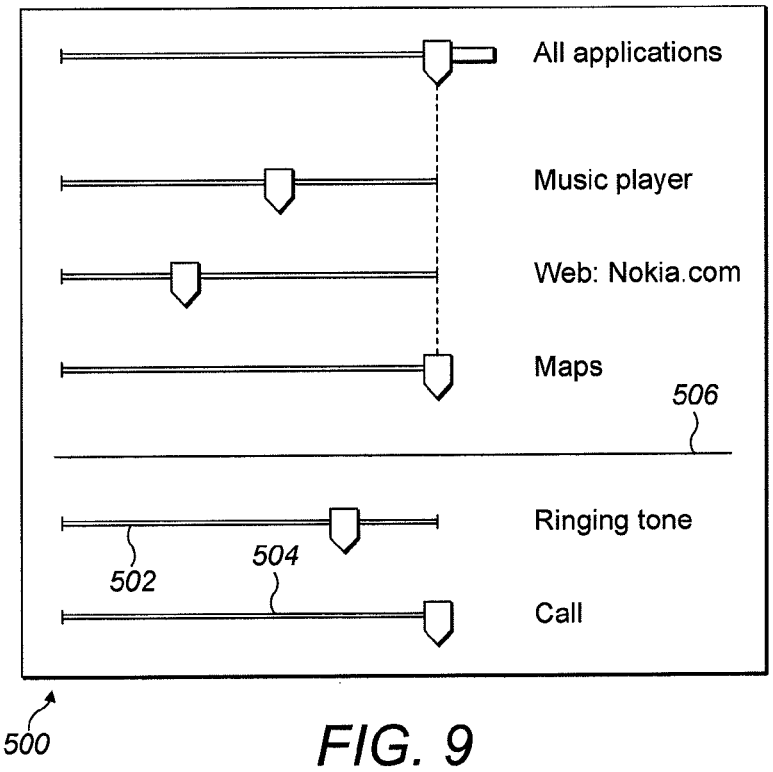
FIGS. 9, 10 and 11 are screenshots from the mobile terminal of FIGS. 1 and 2 showing a volume control panel according to a third embodiment.

FIG. 9 shows a further embodiment of the volume control panel 500. In addition to the master volume level and the three software application volume levels shown in FIGS. 3 to 6, the volume control panel 500 has a ringing tone volume level indicator 502 and a call volume level indicator 504. The ringing tone and call volume level indicators are separated from the other volume level indicators by a divider 506. The divider 506 may be a line drawn across the panel 500 or the separated volume level indicators may be in a separate window, the divider being the empty space between the windows.

It is common for mobile devices such as mobile phones to emit sound alerts. These alerts may, for example, be ringtones, message tones or keypad tones. In some embodiments, the volume levels of sound alerts and other audio settings are controlled by profile settings. Examples of profile settings are "general", "outdoor" and "silent". Profile settings may be accessed and altered by navigating on the terminal to an appropriate settings menu. In some situations, these profile dependent volume settings are not subject to control by the master volume and can only be changed via the profile settings. FIG. 9 is an embodiment of such a situation. If the master volume level is changed, the music, browser and map application volume levels will change as before, but the ringing tone and call volume levels will remain unaffected. The divider 506 allows a user to see which audio outputs will be affected by a change in the master volume level and which will not at a glance. In some other embodiments, although the ringing tone volume level and the call volume level are not subject to control by the master volume level, they may be changed via the volume control panel 500. For example, a user may interact with the tactile interface 110 of the touch sensitive display 102 to select and drag the markers of the ringing tone or call volume level indicators.

Figure 10:
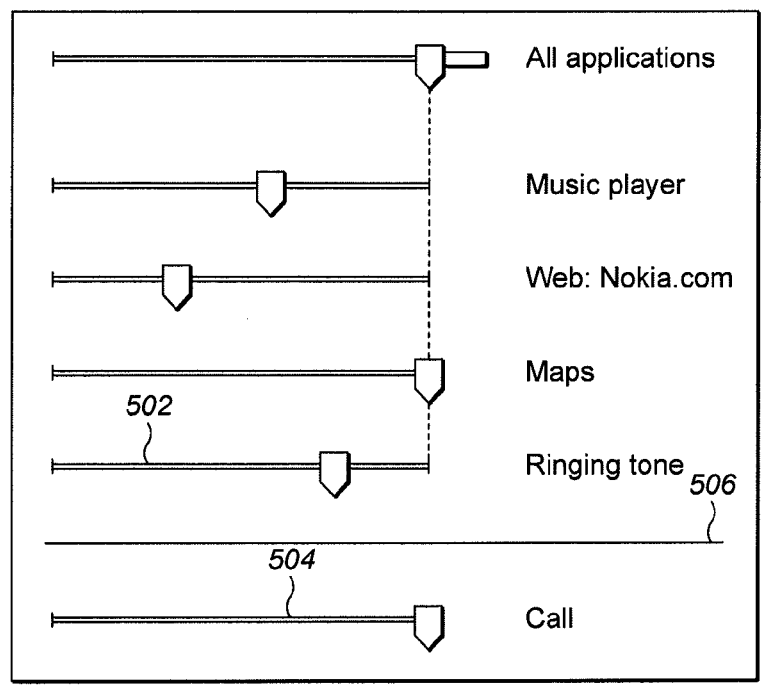

FIG. 10 shows the volume control panel 500 in another embodiment. In the embodiment of FIG. 10, the ringing tone volume level is subject to control by the master volume level. Therefore, the ringing tone volume level indicator 502 is grouped with those other indicators which are also subject to control by the master volume level. The call volume level remains uncontrollable by the master volume level. The ringing tone volume level may change from being not controllable to controllable by the master volume level when the ringing alert is active, i.e. when the terminal receives an incoming call. The ringing tone volume level may revert to being not controllable by the master volume level when the ringing alert ceases. In some embodiments the ringing tone volume may become controllable by the master volume level in response to a setting change instigated by the user. Similarly, the call volume level may become controllable by the master volume level while the terminal is engaged in a voice or video call and the call volume level indicator 504 may be grouped with the other controllable volume levels during this time.

Although this embodiment of the invention has been described with reference to profile dependent audio outputs, in other embodiments volume indicators for any other category of audio output are used similarly to the profile dependent audio outputs described above.

In some embodiments, the transparent overlays 300, 400 of FIGS. 7 and 8 may also display indications of the volume levels of sound alerts which are not controlled by the master volume level. The overlays may have a separate composite volume level indicator relating to these sound alerts.

In some embodiments, external devices such as headphones or speakers may be connected to the terminal 100. These devices may be connected via the headphone port 120 or via the wireless communication module 122 using for example Bluetooth or Wi-Fi. In many instances, the volume control standards used by external devices only support volume settings on a logical scale, with arbitrary mapping to the actual gain value. Therefore, the terminal will be unable to correlate the internal software application volume levels with the external device volume levels. This is often the case when devices are connected wirelessly using, for example, Bluetooth.

Figure 11:
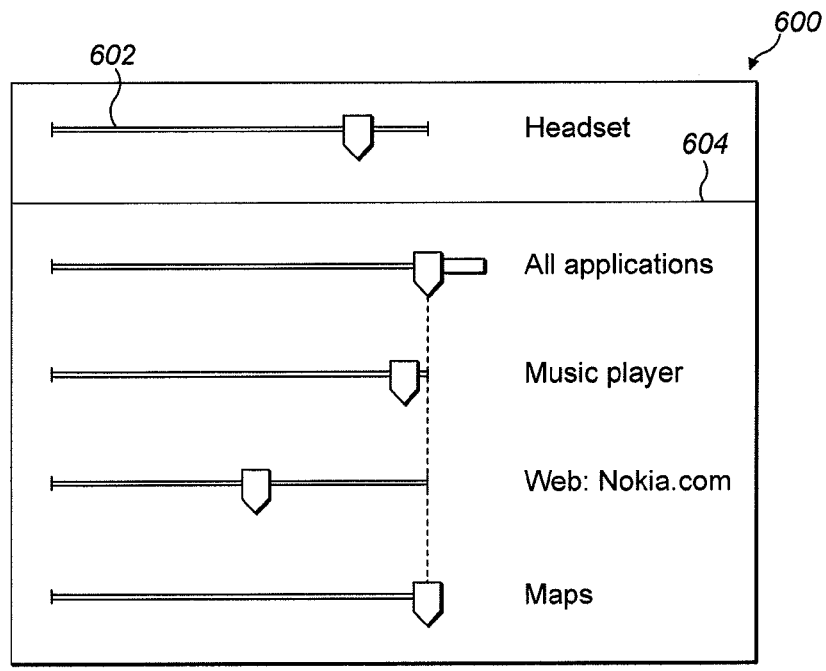

FIG. 11 shows a further embodiment of a volume control panel 600. In addition to the master volume level and the three software application volume levels shown in FIGS. 3 to 6, the volume control panel 600 has a headphone volume level indicator 602. The headphone volume level indicator 602 is separated from the other volume level indicators by a divider 604. The divider 604 may be a line drawn across the panel 600 or the headphone indicator 602 may be in a separate window, the divider being the empty space between the windows. The divide between the headphone indicator 602 and the other indicators signifies that the headphone volume level is not subject to control by the master volume level. When a user command to change the master volume level is received at the terminal 100, the headphone indicator 602 is unaffected.

Figure 12:
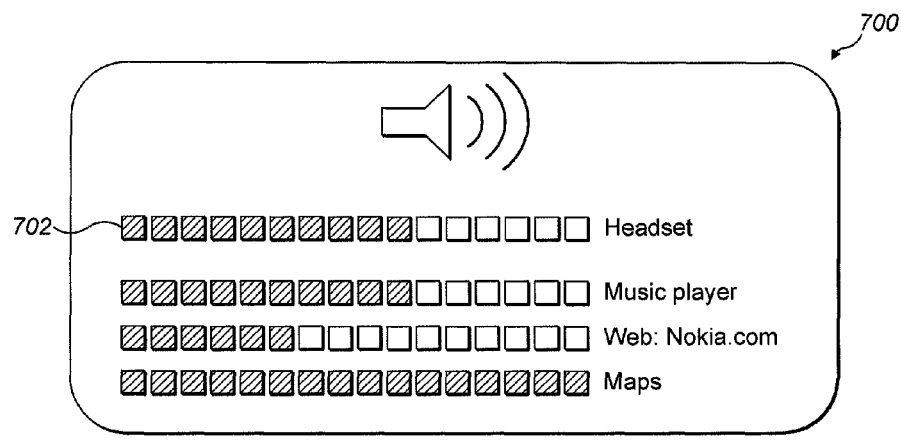
FIG. 12 is a an overlay, displayed on the mobile terminal of FIGS. 1 and 2, showing software application and external device volume levels according to a fourth embodiment.

FIG. 12 shows another embodiment of an overlay 700. The overlay 700 is similar to that shown in FIG. 7 and in addition to the three software application volume levels also contains a headphone volume level indicator 702. The volume levels shown in FIG. 12 relate to those shown in FIG. 11. In the embodiment of FIG. 12, the headphone indicator 702 is separated from the other volume level indicators by a gap. In other embodiments, the headphone indicator 702 may be separated by a divider such as a line or may be in a separate window from the other indicators. The overlay 700 may be displayed in response to a user command to change the master volume, for example a command received at hardware keys 104 in a similar manner to overlays 300 and 400.

In some embodiments, the terminal 100 has no knowledge of the volume level of an associated device such as headphones or speakers. In these embodiments, the headphone volume level indicator 602 may not be present on the volume control panel 600 or it may be greyed out or otherwise disabled. The headphone volume level indicator may instead be replaced with "volume up" and "volume down" controls or indicators. If a transparent overlay 700 is displayed in response to a user command to change the master volume level, the headphone indicator 702 may be greyed out or otherwise disabled. In some embodiments, the headphone volume level may not be known to the terminal 100, but the terminal may still be able to send volume change commands to the headphones. In these embodiments, the "volume up" and "volume down" controls/indicators if present may react to a user command to change the volume level of the headphones by flashing or otherwise undergoing an animation in order to alert a user of a successful volume change command.

As described earlier, each software application associated with the terminal 100 is configured to link its internal volume control with the volume level indicator representing it in the volume control panel. However, existing applications may not be configured to perform this step and therefore not all applications may have a volume level indicator in the volume control panel. In some embodiments, the terminal 100 is configured to create a volume control relating to all applications which cannot individually link themselves to a unique volume level indicator.

Figure 13:
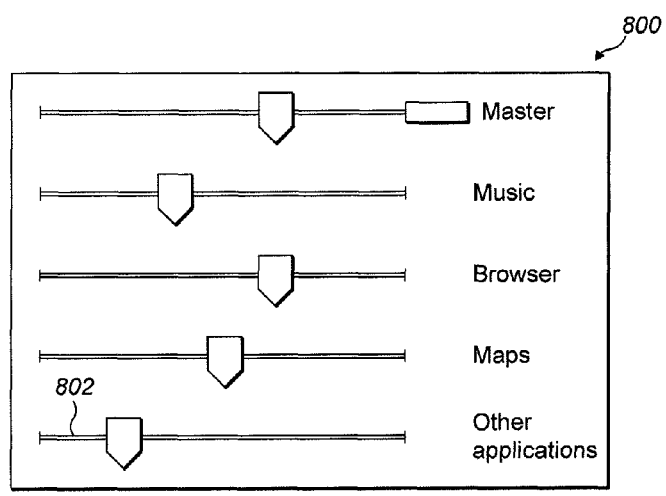
FIG. 13 is a further embodiment of a screenshot from the mobile terminal of FIGS. 1 and 2 showing a volume control panel according to a fifth embodiment.

FIG. 13 shows a volume control panel 800 of another embodiment. In addition to the master volume level and the three software application volume levels shown in FIGS. 3 to 6, the volume control panel 800 has an other applications volume level indicator 802. The other applications indicator 802 is subject to control by the master volume level in the same way as each of the other software application volume levels on control panel 800. The other applications indicator 802 may however relate to several existing applications and simultaneously affects the volume levels of each of these existing applications. This feature allows advantages of the invention to be applied to existing applications, thereby increasing the usefulness of the invention.

The other applications volume level may also assume additional functionality as this setting may be the preferred start up volume for any application. For this reason, the other applications volume setting may instead be called the default volume level.

Figure 14:
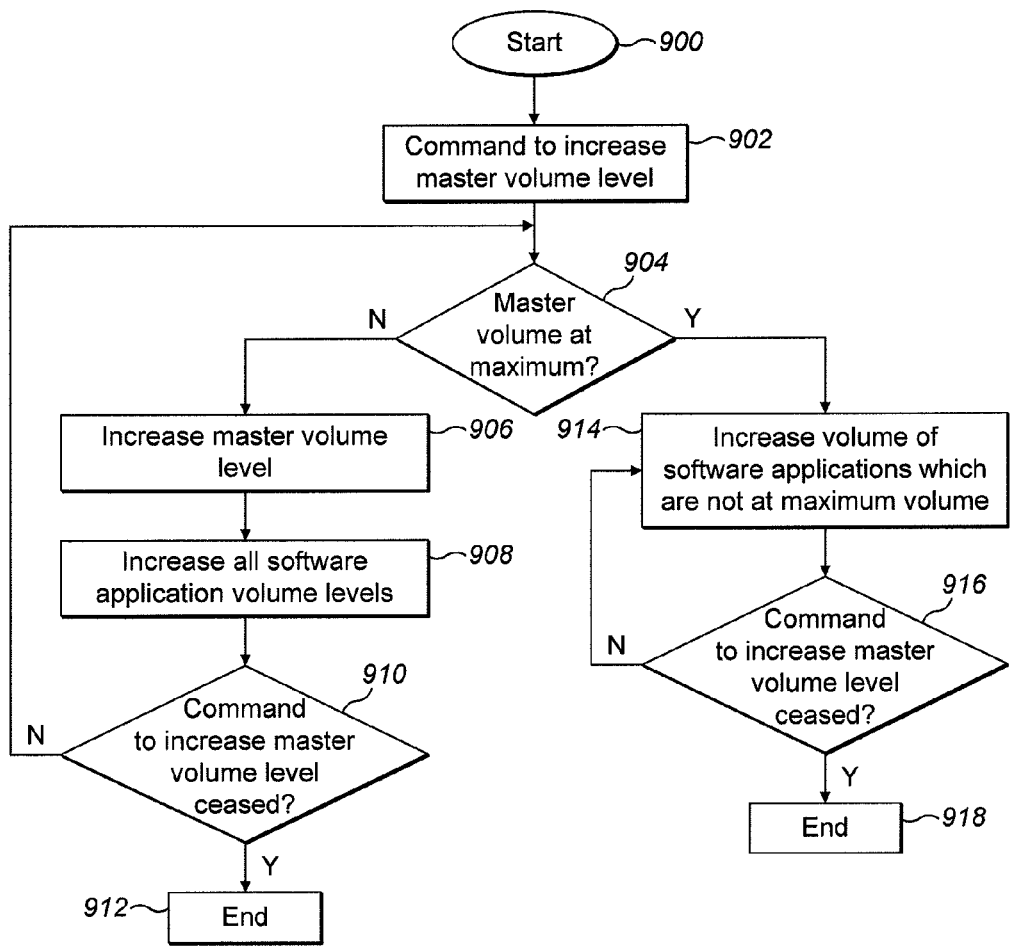
FIG. 14 is a flow chart depicting exemplary operation of the mobile terminal of FIGS. 1 and 2 according to various embodiments.

Exemplary operation of the terminal 100 will now be described with reference to the flow chart of FIG. 14. The operation begins at step 900. At step 902 a command to increase the master volume level is received at the terminal 100. This command is the result of a user input at the tactile interface 110 of the touch sensitive display 102 or at dedicated hardware keys 104. At step 904, it is determined if the master volume level is at a maximum level. If the master volume level is not at a maximum level, the master volume level is increased at step 906. In response to the increase in the master volume level, the volume levels of all those software application which are subject to the control of the master volume level are increased at step 908. If any active applications are not subject to the control of the master volume level, these applications remain unaffected by the increase in the master volume level.

At step 910 it is determined if the command to increase the master volume level has ceased. If the command to increase the master volume level has ceased, the method ends at step 912. If the command to increase the master volume level has not ceased, the method returns to step 904. The method will cycle through steps 904 to 910 until such time as the command to increase the master volume level ceases or the master volume level reaches a maximum level.

If it is determined at step 904 that the master volume level is at a maximum level when a command to increase the master volume level is received, the method continues to step 914. At step 914, the volume level of each of the software applications which are not at the maximum volume level is increased. The volume levels of any software application which is at the maximum level cannot be increased further. At step 916, it is determined if the command to increase the master volume level has ceased. If the command to increase the master volume level has not ceased, the method continues at step 914. If the command to increase the master volume level has ceased, the method ends at step 918.

In some embodiments of the invention, a user may select and drag the master volume level slider marker 203 using the tactile interface 110 of the display 102 in order to increase the master volume level. This type of input may be considered to be a "single user input" which ceases when the user stops moving the selected slider even if the user has not deselected the slider.

It will be appreciated that the above described embodiments are purely illustrative and are not limiting on the scope of the invention. Other variations and modifications will be apparent to persons skilled in the art upon reading the present application.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

The invention claimed is:

1. Apparatus, the apparatus having at least one processor and at least one memory having computer-readable code stored thereon which when executed controls the at least one processor:
   independently to control the output volume levels of a plurality of software applications associated with an apparatus;
   to cause a master volume level indicator, comprising a slider with a slider marker, to be displayed;
   to respond to a user command to change a master volume level by changing the volume levels of each of the software applications in the same sense; and
   when one of the plurality of software applications is at a maximum volume level, to respond to a user command to increase the master volume level by increasing the volume levels of each of the other software applications which are not at the maximum level, wherein the master volume indicator has an additional region beyond a maximum volume position and wherein increasing the master volume level when one of the plurality of software applications is at a maximum volume level comprises causing the master volume slider marker to be moved into the additional region.

2. An apparatus according to claims 1, wherein the master volume slider marker automatically returns to the maximum volume position when the user command to increase the master volume level ceases.

3. An apparatus according to claim 1, wherein the computer-readable code when executed controls the at least one processor to cause indications of the output volume levels of the plurality of software applications to be displayed, and optionally wherein the software application volume level indicators are sliders with slider markers.

4. An apparatus according to claim 1 wherein the user commands to change or increase the master volume level are received via a touch sensitive display of the apparatus.

5. An apparatus according to claim 1, wherein the user command to change or increase the master volume level is received at a hardware key of the apparatus.

6. An apparatus according to claim 1, wherein the user command to change or increase the master volume level is received at a hardware key of an external device.

7. An apparatus according to claim 3, wherein the user command to change or increase the master volume level is received at a hardware key, and wherein the indications of the output volume levels of the plurality of software applications are displayed as an overlay in response to the user command to change or increase the master volume level.

8. An apparatus according to claim 7, wherein when the overlay is caused to be displayed, user commands other than commands received at a hardware key of the apparatus do not result in any change in volume levels.

9. An apparatus according to claim 1, wherein the software applications are installed on the apparatus.

10. An apparatus according to claim 1, wherein the rate at which the volume levels of each of the software applications which are not at the maximum level increase is dependent upon the distance by which the master volume slider marker exceeds the maximum volume position.

11. An apparatus according to claim 1, wherein the computer-readable code when executed controls the at least one processor to cause indications of the output volume levels of one or more sounds to be displayed, wherein the one or more sounds are only responsive to the means responsive to a user command to increase the master volume level for increasing the volume levels of each of the other software applications which are not at the maximum level when actively in use.

12. An apparatus according to claim 1, wherein the computer-readable code when executed controls the at least one processor to cause indications of the output volume levels of one or more sounds to be displayed, wherein the one or more sounds are not responsive to the means responsive to a user command to increase the master volume level for increasing the volume levels of each of the other software applications which are not at the maximum level.

13. An apparatus according to claim 11, wherein the one or more sounds are one or more profile dependent sounds.

14. An apparatus according to claim 1, wherein the computer-readable code when executed controls the at least one processor to cause indications of the output volume levels of external devices in communication with the apparatus to be displayed, wherein the external devices are not responsive to the means responsive to a user command to increase the master volume level for increasing the volume levels of each of the other software applications which are not at the maximum level.

15. An apparatus according to claim 1, wherein a subclass of the plurality of software applications exists, wherein the computer-readable code when executed controls the at least one processor to cause individual indications of the output volume levels for the software applications comprising the subclass to be displayed and to cause an indication relating to the output volume level of this subclass of software applications to be displayed.

16. A method comprising:
  independently controlling the output volume levels of a plurality of software applications associated with an apparatus;
  causing a master volume level indicator, comprising a slider with a slider marker, to be displayed;
  responding to a user command to change a master volume level by changing the volume levels of each of the software applications in the same sense; and
  when one of the plurality of software applications is at a maximum volume level, responding to a user command to increase the master volume level by increasing the volume levels of each of the other software applications which are not at the maximum level, wherein the master volume indicator has an additional region beyond a maximum volume position and wherein increasing the master volume level when one of the plurality of software applications is at a maximum volume level comprises causing the master volume slider marker to be moved into the additional region.

17. A non-transitory computer-readable storage medium having stored thereon computer-readable code, which, when executed by computing apparatus, causes the computing apparatus to perform a method comprising:
  independently controlling the output volume levels of a plurality of software applications associated with an apparatus;
  causing a master volume level indicator, comprising a slider with a slider marker, to be displayed;
  responding to a user command to change a master volume level by changing the volume levels of each of the software applications in the same sense; and
  when one of the plurality of software applications is at a maximum volume level, responding to a user command to increase the master volume level by increasing the volume levels of each of the other software applications which are not at the maximum level, wherein the master volume indicator has an additional region beyond a maximum volume position and wherein increasing the master volume level when one of the plurality of software applications is at a maximum volume level comprises causing the master volume slider marker to be moved into the additional region.

* * * * *